United States Patent
Cohen (10) Patent No.: US 11,954,086 B2
(45) Date of Patent: *Apr. 9, 2024

(54) INDEX DATA STRUCTURES AND GRAPHICAL USER INTERFACE

(71) Applicant: CFPH, LLC, New York, NY (US)

(72) Inventor: Menashe Cohen, Tenafly, NJ (US)

(73) Assignee: CFPH, LLC, New York, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/567,230

(22) Filed: Jan. 3, 2022

(65) Prior Publication Data

US 2022/0121638 A1    Apr. 21, 2022

Related U.S. Application Data

(63) Continuation of application No. 16/028,641, filed on Jul. 6, 2018, now Pat. No. 11,216,432.

(51) Int. Cl.
*G06F 16/20* (2019.01)
*G06F 16/22* (2019.01)
*G06F 16/245* (2019.01)

(52) U.S. Cl.
CPC ...... *G06F 16/2255* (2019.01); *G06F 16/2237* (2019.01); *G06F 16/2246* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 11,216,432 B2 | 1/2022 | Cohen | |
| 2004/0015478 A1 | 1/2004 | Pauly et al. | |
| 2004/0133564 A1 | 7/2004 | Gross et al. | |
| 2010/0299326 A1 | 11/2010 | Germaise | |
| 2012/0197934 A1 | 8/2012 | Zhang et al. | |
| 2014/0122455 A1* | 5/2014 | Leitner | G06F 16/951 707/706 |
| 2014/0337375 A1 | 11/2014 | Yue | |
| 2016/0055191 A1 | 2/2016 | Joshi et al. | |
| 2016/0103931 A1* | 4/2016 | Appavu | G06F 16/24522 707/760 |
| 2019/0095510 A1* | 3/2019 | Cruise | G06F 16/24568 |
| 2019/0227999 A1* | 7/2019 | Simeonov | G06F 16/212 |

OTHER PUBLICATIONS

PCT International Search Report and Written Opinion dated Oct. 17, 2019 corresponding to PCT Application No. PCT/US19/40352 filed Jul. 2, 2019 (6 pages).

* cited by examiner

*Primary Examiner* — Jau Shya Meng (57) ABSTRACT

Disclosed herein are an apparatus, non-transitory computer readable medium, and method for querying big data and displaying the results of the query. A multilevel hierarchy of data structures is associated with a particular date to reduce the linearity of the search. The client receiving the query results stores the results in a linked list with a record format consistent with the resulting records. The client also periodically refreshes a graphical user interface with the query results until all the results are received.

16 Claims, 11 Drawing Sheets

| Status | Sym | LastShar | LastPx | ExecBro... | Cust | Liqind | Bid | Ask | Book | TranTime | TradeDate | LastMkt | LastCap... |
|---|---|---|---|---|---|---|---|---|---|---|---|---|---|
| FILL BOT | WEICY | 500 | 9.04 | CANT | JPMS | | 9.04 | 9.09 | SP3N | 14:25:57 | 20180301 | XOTC | P |
| FILL BOT | FNMA | 585 | 1.605 | CANT | WRET | | 1.60 | 1.61 | SP5O | 14:25:56 | 20180301 | XOTC | P |
| FILL BOT | UOVEY | 43 | 41.714 | CANT | MLEX | | 41.68 | 41.85 | SP3N | 14:25:52 | 20180301 | XOTC | P |
| PFILL BOT | TCEHY | 300 | 55.20 | ARCA | ADAGC | N | 55.20 | 55.20 | SP3N | 14:25:51 | 20180301 | ARCX | P |
| FILL SOLD | TCEHY | 300 | 55.20 | CANT | | N | 0.00 | 0.00 | SP3N | 14:25:51 | 20180301 | 11 | |
| PFILL SOLD | TCEHY | 500 | 55.20 | ARCA | ADAGC | R | 55.20 | 55.24 | SP3N | 14:25:46 | 20180301 | BB | P |
| FILL SOLD | TCEHY | 500 | 55.20 | CANT | | R | 0.00 | 0.00 | SP3I | 14:25:46 | 20180301 | 11 | |
| FILL SSOLD | JSDA | 2,000 | 0.3399 | NITE | NFSC | Y | 0.33 | 0.3399 | SP3I | 14:25:46 | 20180301 | KNEM | P |
| FILL BOT | JSDA | 2,500 | 0.3399 | CANT | | Y | 0.00 | 0.00 | BDS2 | 14:25:44 | 20180301 | 11 | |
| FILL BOT | SNPHY | 172 | 15.312 | CANT | MLEX | | 15.28 | 15.44 | BDS2 | 14:25:44 | 20180301 | XOTC | P |
| FILL BOT | SBGSY | 250 | 16.932 | CANT | MLEX | | 16.91 | 17.02 | BDF2 | 14:25:42 | 20180301 | XOTC | P |
| FILL BOT | RHHBY | 8 | 28.614 | CANT | MLEX | | 28.61 | 28.63 | SP3M | 14:25:41 | 20180301 | XOTC | P |
| FILL BOT | RHHBY | 64 | 28.614 | CANT | MLEX | | 28.61 | 28.63 | SP3M | 14:25:41 | 20180301 | XOTC | P |

INDEX DATA STRUCTURES AND GRAPHICAL USER INTERFACE

BACKGROUND

Today's computing devices and applications generate an overwhelming amount of data ("big data") that can be used for critical decision making, predictive analytics, business intelligence, and the like. Such devices and applications may include, but are not limited to, sensors, mobile phones, laptops, and social networking applications. Fortunately, the cost of data storage capacity has decreased.

BRIEF DESCRIPTION OF THE DRAWINGS

FIGS. 5-5B is a further working example in accordance with aspects of the present disclosure.

SUMMARY

Although big data provides many benefits, processing such data in an efficient manner is a constant challenge. Traditional data processing is not able to cope with the complexity and volume of big data sets. As a result, many different solutions have evolved to deal with big data and many database indices have been designed. In some instances, certain queries may be very common. For example, users often search for transactions occurring on a specific date. Despite having some advanced knowledge of such queries, the data indexing is not organized accordingly. On the client side, receiving and displaying the results of large data queries may also be a challenge, since the results themselves are also large and complex. This may lead to users experiencing a sluggish response from their graphical user interface ("GUI").

In view of the foregoing, disclosed herein are an apparatus, non-transitory computer readable medium, and method for querying and displaying big data sets. The techniques disclosed herein improve computer performance by allowing the computer to query and display big data sets in a more efficient manner. In turn, users may experience less delay on the GUI and the burden placed on the database may be reduced.

In one example, an apparatus may comprise a memory and at least one processor configured to execute the following operations: generate an index in the memory, the index comprising a hierarchy of interlinked data structures and a hash table such that an entry in the hash table comprises an association between a date and a first data structure in the hierarchy of interlinked data structures; receive a search request from a remote device, the search request comprising a plurality of search parameters including the date; search the hash table, using the date, for a memory address of the first data structure in the hierarchy of interlinked data structures; determine a plan for traversing the hierarchy of interlinked data structures based on the search parameters; begin a search for data sought after by the search request at the first data structure in accordance with the traversal plan; and return results of the search to the remote device.

In a further example, a method is disclosed. The method may comprise: generating, by at least one processor, an index in a memory, the index comprising a hierarchy of interlinked data structures and a hash table such that an entry in the hash table comprises an association between a date and a first data structure in the hierarchy of interlinked data structures; receiving, by the at least one processor, a search request from a remote device, the search request comprising a plurality of search parameters including the date; searching, by the at least one processor, the hash table, using the date, for a memory address of the first data structure in the hierarchy of interlinked data structures; determining, by the at least one processor, a plan for traversing the hierarchy of interlinked data structures based on the search parameters; beginning, by the at least one processor, a search for data sought after by the search request at the first data structure in accordance with the traversal plan; and returning, by the at least one processor, results of the search to the remote device.

In yet another example, an apparatus may comprise a memory, a display device, and at least one processor to execute the following operations: render a graphical user interface on the display device; transmit a search request to a remote server; receive a plurality of records in response to the search request, wherein a format of each received record matches a format of each memory space allocated for each record; copy each received record to a respective allocated memory space; add each allocated memory space to a linked list of memory spaces such that an order of the linked list reflects the order in which the plurality of records are received; and periodically render currently received records on the graphical user interface until all data records responsive to the search request are received.

The aspects, features and advantages of the present disclosure will be appreciated when considered with reference to the following description of examples and accompanying figures. The following description does not limit the application; rather, the scope of the disclosure is defined by the appended claims and equivalents.

DETAILED DESCRIPTION

Figure 1:
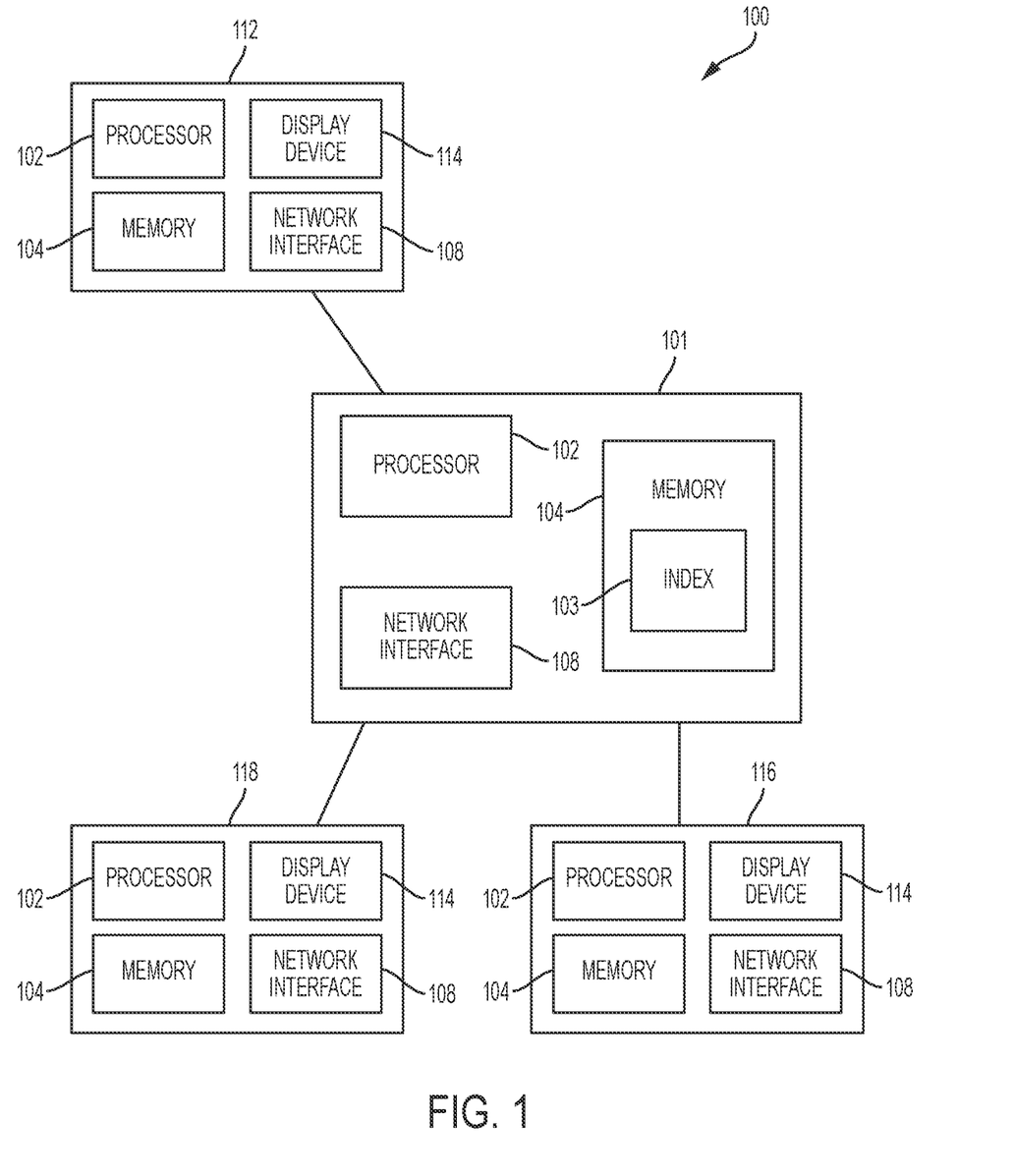
FIG. 1 is an example system in accordance with aspects of the disclosure.

FIG. 1 presents a schematic diagram of an illustrative system 100 for executing the operations of the present disclosure. Computer apparatus 101, 112, 116, and 118 may each comprise a device capable of processing instructions and transmitting data to and from other computers. In the example of FIG. 1, computer apparatus 101 may be a server computer containing a large data repository arranged as an index 103. Computer apparatus 112, 116, and 118, may be client computers for querying data from computer apparatus 101 and displaying the query results. Each apparatus shown in FIG. 1 may include all the components normally used in connection with a computer. For example, each may have a keyboard and mouse and/or various other types of input devices such as pen-inputs, joysticks, buttons, touch screens, etc., as well as a display 114, which could include, for instance, a CRT, LCD, plasma screen monitor, TV, projector, etc.

Each computer apparatus shown in FIG. 1 may also contain at least one processor 102, which may be any number of well known processors, such as processors from Intel® Corporation. In another example, processor 102 may be an application specific integrated circuit ("ASIC"). Each computer may also comprise a memory 104 to store instructions that may be retrieved and executed by processor 102. As noted above, memory 104 of computer apparatus 101 may also store index 103. As will be discussed in more detail further below, index 103 may be a database organized in a specific manner to optimize queries for data occurring on a specific date. In one example, memory 104 may be a random access memory ("RAM") device. In a further example, memory 104 may be divided into multiple memory segments organized as dual in-line memory modules ("DIMMs"). Alternatively, memory 104 may comprise other types of devices, such as non-transitory computer readable media. Non-transitory computer readable media may comprise any one of many physical media (e.g., electronic, magnetic, optical, electromagnetic, or semiconductor media). More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to a computer apparatus directly or indirectly. Memory 104 may also include any combination of one or more of the foregoing and/or other devices as well. Although all the components of each computer apparatus are functionally illustrated as being within the same block, it will be understood that the components may or may not be stored within the same physical housing.

The computers shown in FIG. 1 may also be interconnected via a network using network interface 108. The network may be a local area network ("LAN"), wide area network ("WAN"), the Internet, etc. Network interface 108 may use various protocols including virtual private networks, local Ethernet networks, private networks using communication protocols proprietary to one or more companies, cellular and wireless networks, HTTP, and various combinations of the foregoing. Although only a few computers are depicted herein, it should be appreciated that a network may include additional interconnected computers.

As noted above, the instructions residing in memory 104 may be retrieved and executed by processor 102. These instructions may comprise any set of instructions to be executed directly (such as machine code) or indirectly (such as scripts) by processor 102. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Figure 2:
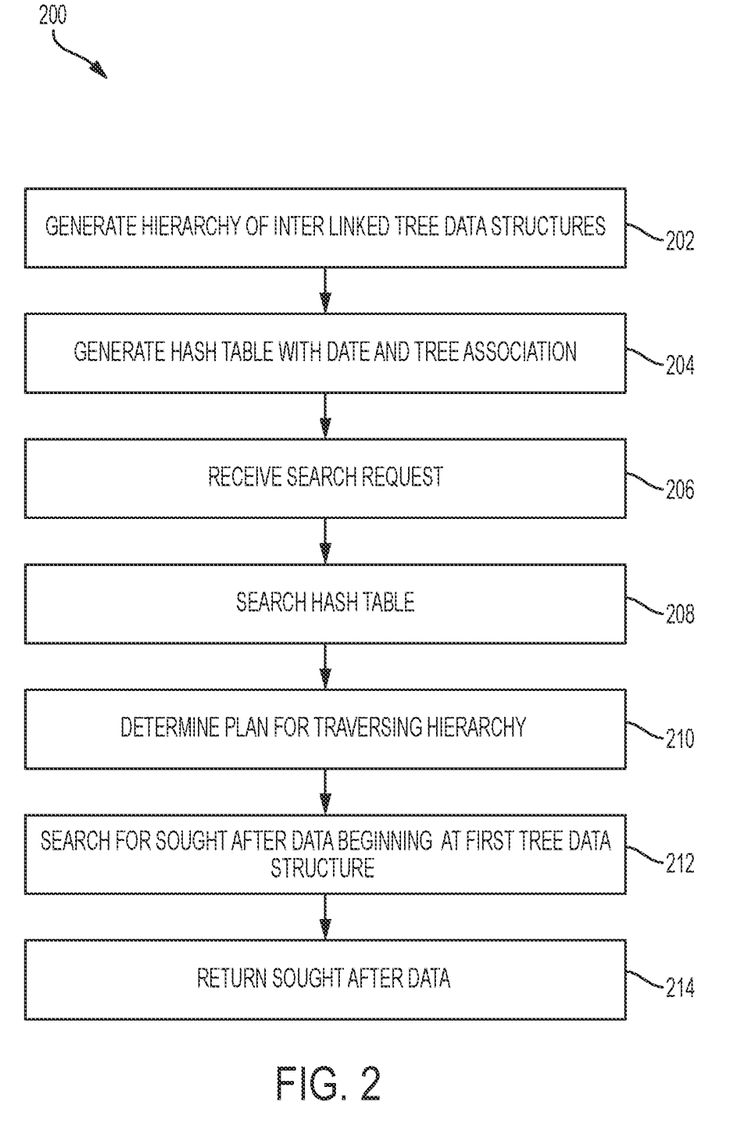
FIG. 2 is an example flow diagram in accordance with aspects of the disclosure.
Figure 3:
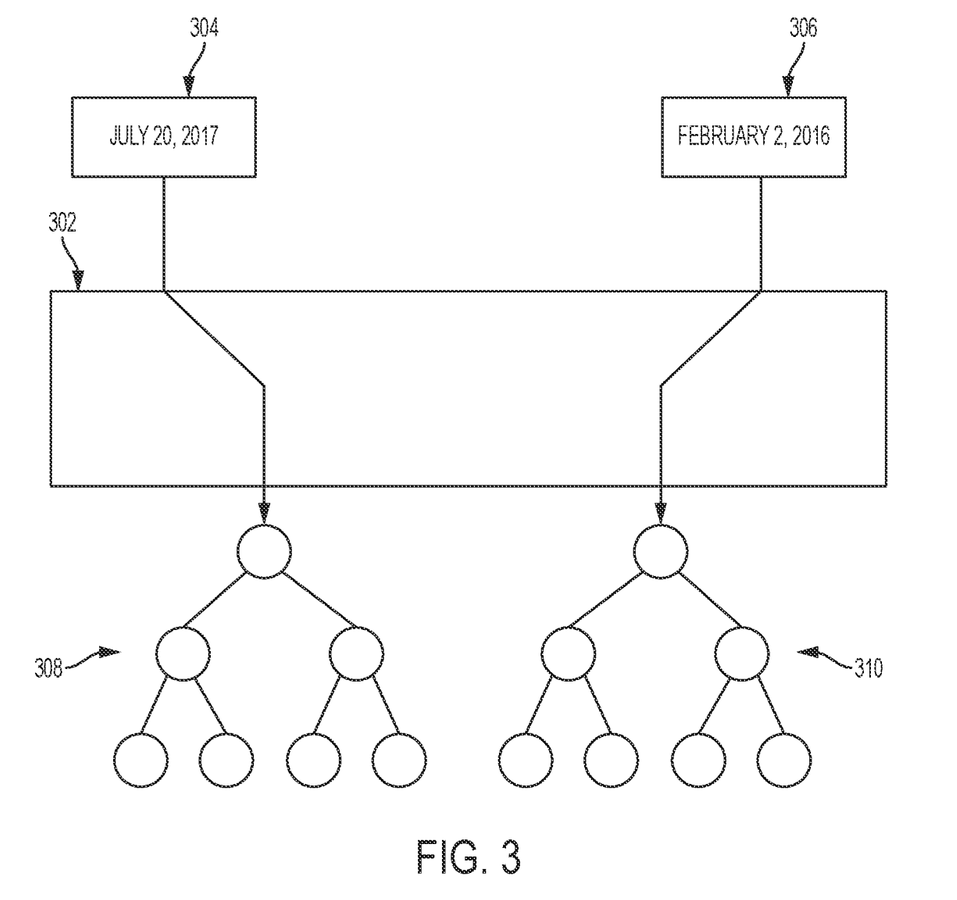
FIGS. 3-3D depict working examples in accordance with aspects of the disclosure.
Figure 3A:
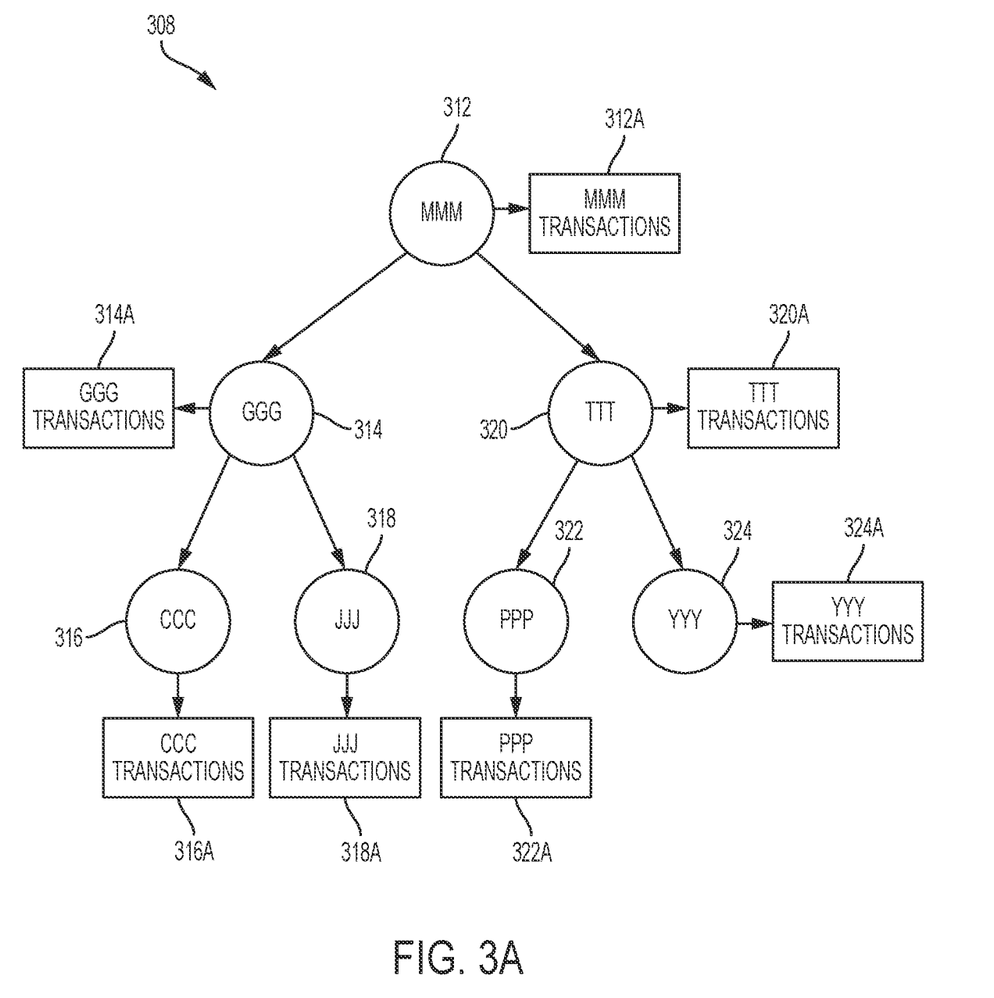
Figure 3B:
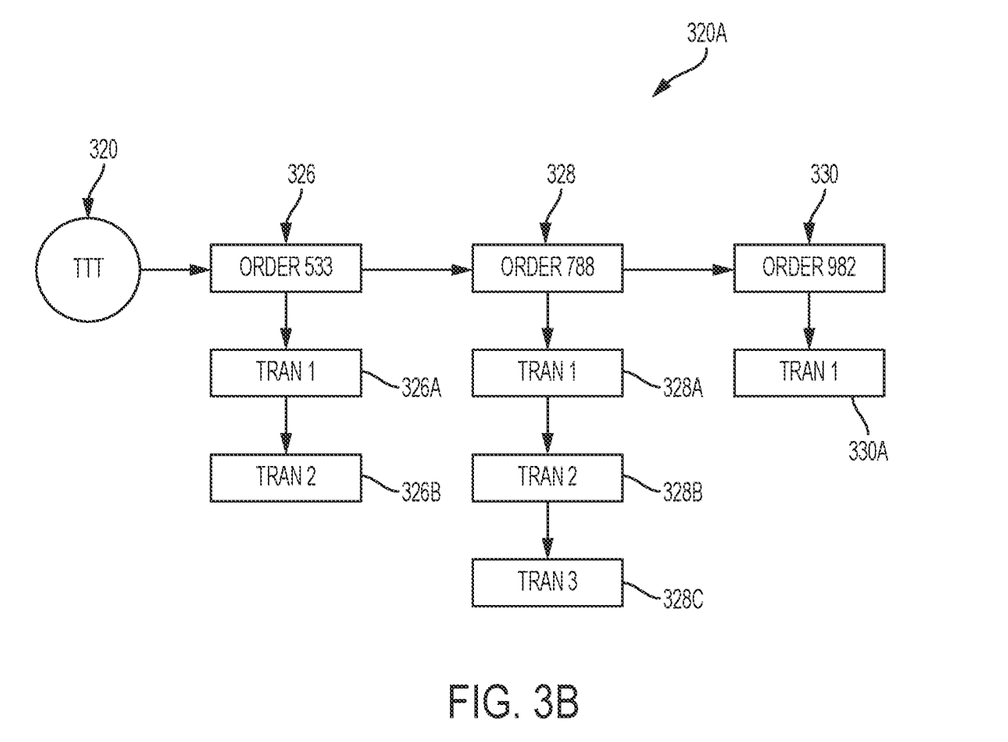
Figure 3C:
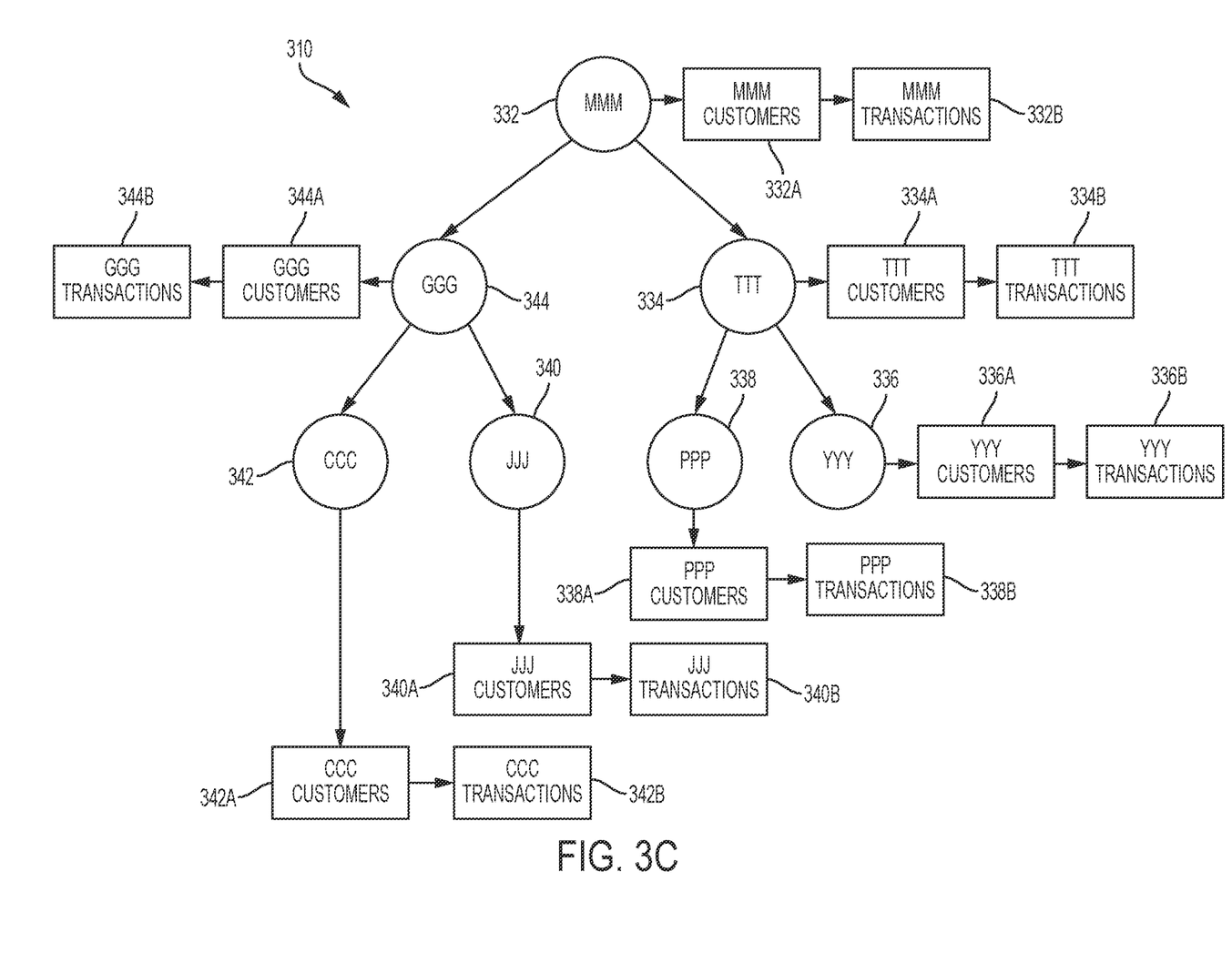
Figure 3D:
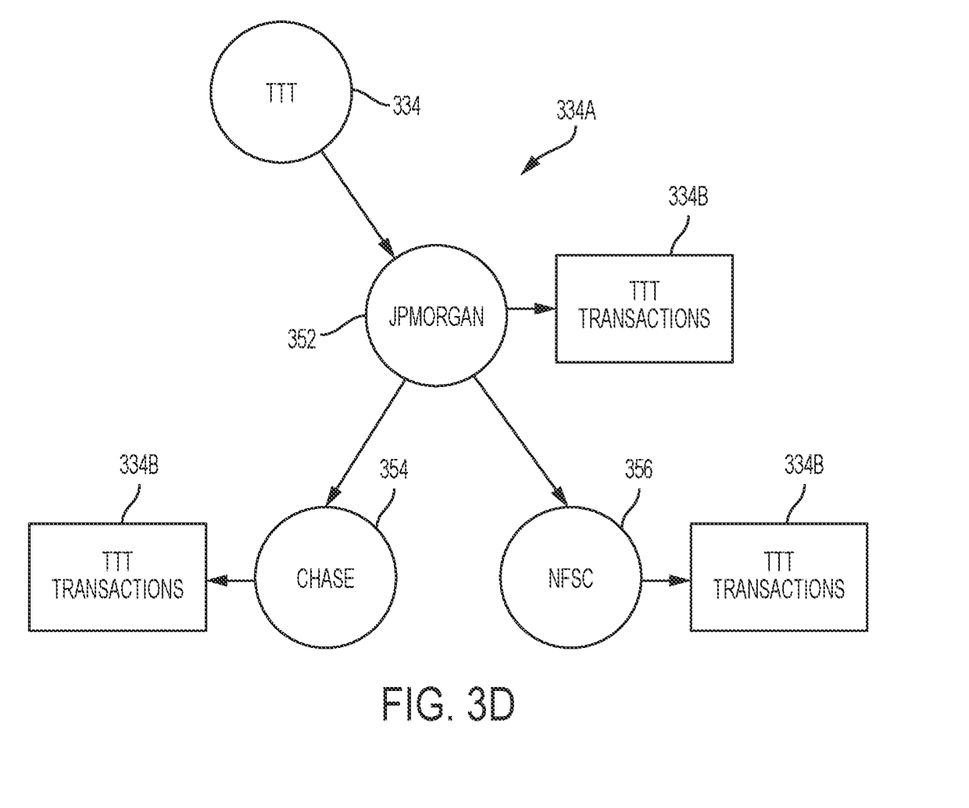

One working example in accordance with the techniques herein is shown in FIGS. 2-3D. In particular, FIG. 2 illustrates a flow diagram of an example method 200 for responding to a query. FIGS. 3-3D show a corresponding working example. The actions shown in FIGS. 3-3D will be discussed below with regard to the flow diagram of FIG. 2.

Referring to FIG. 2, at least one processor may generate a hierarchy of interlinked data structures in a memory, as shown in block 202. The hierarchy of interlinked data structures may be part of a database index and may include, but are not limited to, binary tree data structures, linked list data structures, vector data structures, or the like. As will be discussed in further detail, each node of a data structure in a given level of the hierarchy may contain a pointer to a corresponding node in a second data structure at the next level.

Referring now to block 204, at least one processor may generate a hash table in the memory. The hash table may be another aspect of the index. In one example, each entry in the hash table may comprise an association between a date and a first data structure of a hierarchy of interlinked data structures. Referring now to FIG. 3, an illustrative hash table 302 is shown. Hash table 302 shows an association between date 304 (i.e., Jul. 20, 2017) and data structure 308 and date 306 (i.e., Feb. 2, 2016) with data structure 310. In the example of FIG. 3, data structure 308 and data structure 310 are binary search trees ("BST"). Furthermore, data structure 308 and data structure 310 may each be the first data structure in their respective data structure hierarchies. The illustrative hash table 302 may allow a query with a date to be mapped efficiently to the relevant data for that date. While data structures 308/310 are each at the first level of the hierarchy that leads to the data sought after by a query, it is possible that the sought after data may be found in the first level. As will be discussed in more detail further below, an advantage of using a binary tree as a first layer is that the binary trees may reflect structural relationships in the data. The structural relationship may reduce the time is takes the computer to find the requested data.

Referring back to FIG. 2, at least one processor may receive a search request from a remote device, as shown in block 206. The search request may include a date and a plurality of other search parameters. In block 208, at least one processor may search the hash table (e.g., hash table 302), using the date, for an associated memory address of a first data structure of a hierarchy of data structures. In block 210, at least one processor of a computer may determine a plan for traversing the hierarchy of interlinked data structures based on the search parameters. In one example, determining a traversal plan may include determining a depth in the hierarchy where the sought after data may be found based on the search parameters. At least one processor may begin a search for the sought after data at the first data structure of the hierarchy, as shown in block 212.

Referring now to FIG. 3A, a close up illustration of data structure 308 is shown. By way of example, the data may include transactions of financial products, and the data being sought by a query is all trading transactions executed for a stock symbol "TTT" on Jul. 20, 2017. As shown in FIG. 3, the date Jul. 20, 2017 is mapped to data structure 308. While the BST of FIG. 3A contains only seven nodes 312, 314, 316, 318, 320, 322, and 324, it is understood that a BST in a big data environment would have a much larger number of nodes and that a small number of nodes is shown in FIG. 3A for ease of illustration. Each memory node in this example stores a stock symbol. The root node 312 contains the stock symbol "MMM" and the nodes branching from the left of root node 312 may be alphabetically less than "MMM" while the nodes branching from the right side may be alphabetically greater than "MMM." At least one processor may traverse the BST from root to leaf making comparisons along the way in its search for the "TTT" symbol. On average, the BST may be arranged such that each comparison allows a processor to skip about half of the tree. In this manner, the time to look up a symbol may be proportional to the logarithm of the number of items stored in the tree, which is more efficient that a linear search.

The BST 308 may be a first data structure in a hierarchy of data structures in this example. Each node in the BST shown in FIG. 3A may contain a pointer to a second data structure in the hierarchy. The first level of the hierarchy may contain the symbols while the second level of the hierarchy may contain the transactions associated with that symbol on that particular day. In the example of FIG. 3A, node 312 contains a pointer to data structure 312A containing all the transactions for symbol "MMM" on Jul. 20, 2017; node 320 contains a pointer to data structure 320A containing all the transactions for symbol "TTT" on Jul. 20, 2017; node 314 contains a pointer to data structure 314A containing all the transactions for symbol "GGG" on Jul. 20, 2017; node 316 contains a pointer to data structure 316A containing all the transactions for symbol "CCC" on Jul. 20, 2017; node 318 contains a pointer to data structure 318A containing all the transactions for symbol "JJJ" on Jul. 20, 2017; node 322 contains a pointer to data structure 322A containing all the transactions for symbol "PPP" on Jul. 20, 2017; and, node 324 contains a pointer to data structure 324A containing all the transactions for symbol "YYY" on Jul. 20, 2017. The example of FIG. 3A contains only two levels of data, but it is understood that the hierarchy may contain as many levels as needed to cater to a particular query. That is, the data may contain more levels to make the search less linear.

Referring now to FIG. 3B, a close up illustration of the data structure 320A is shown. A processor may arrive at node 320 of the BST in its search for "TTT" transactions on Jul. 20, 2017. However, in this working example, the first level data structure 308 only contains the symbols. The transactions may be found in the next level. As noted above, data structure 320A is at a second level of the hierarchy and contains all the transactions for symbol "TTT" on Jul. 20, 2017. In the example of FIG. 3B, data structure 320A may be a vector data structure. The vector data structure of FIG. 3B shows three nodes 326, 328, and 330 representing orders for symbol "TTT" on Jul. 20, 2017. Each node contains a further linked list branching out therefrom that represents transactions for each order. For example, node 326 may represent an order with two transactions 326A and 326B branching out therefrom; node 328 may represent an order with three transactions 328A, 328B, and 328C branching out therefrom; and, node 330 may represent an order with one transaction 330A branching out therefrom. Referring back to the method of FIG. 2, the results of the query may be returned, as shown in block 214. Referring back to FIG. 3B, the data in vector data structure 320A may be sent back to the device requesting this information. While this example uses a vector data structure for the orders, it is understood that other types of data structures may be used in other situations, such as arrays, linked lists, or the like.

As noted above, the data structures may have more than two levels of data depending on the queries that are most frequently received. In the example of FIG. 3C, binary data structure 310 is shown with three levels branching out therefrom. As seen previously in FIG. 3, data structure 310 is associated with the date Feb. 2, 2016 in the hash table 302. The illustrative hierarchy of FIG. 3C is a three tier hierarchy of data. In particular, the example of FIG. 3C contains a level between symbols and transactions that is indicative of customers. This arrangement may be beneficial when queries for symbol transactions by particular customers are common. In the example hierarchy of FIG. 3C, node 332 contains symbol "MMM" and a pointer to data structure 332A containing customers transacting with symbol "MMM;" in turn, data structure 332A contains a pointer to a transactions data structure 332B indicative of transactions for symbol "MMM" by the customer. Node 344 contains symbol "GGG" and a pointer to data structure 344A containing customers transacting with symbol "GGG;" in turn, data structure 344A contains a pointer to a transactions data structure 344B indicative of transactions for symbol "GGG" by the customer. Node 334 contains symbol "TTT" and a pointer to data structure 334A containing customers transacting with symbol "TTT;" in turn, data structure 334A contains a pointer to a transactions data structure 334B indicative of transactions for symbol "TTT" by the customer. Node 342 contains symbol "CCC" and a pointer to data structure 342A containing customers transacting with symbol "CCC;" in turn, data structure 342A contains a pointer to a transactions data structure 342B indicative of transactions for symbol "CCC" by the customer. Node 340 contains symbol "JJJ" and a pointer to data structure 340A containing customers transacting with symbol "JJJ;" in turn, data structure 340A contains a pointer to a transactions data structure 340B indicative of transactions for symbol "JJJ" by the customer. Node 338 contains symbol "PPP" and a pointer to data structure 338A containing customers transacting with symbol "PPP;" in turn, data structure 338A contains a pointer to a transactions data structure 338B indicative of transactions for symbol "PPP" by the customer. Node 336 contains symbol "YYY" and a pointer to data structure 336A containing customers transacting with symbol "YYY;" in turn, data structure 336A contains a pointer to a transactions data structure 336B indicative of transactions for symbol "YYY" by the customer.

Referring now to FIG. 3D, a close up illustration of customers data structure 334A is shown. As seen in FIG. 3C, the "TTT" symbol node 334 is associated with data structure 334A by way of a pointer. The data structure 334A may also be arranged as a BST with root node 352 containing customer "JPMorgan;" node 354 containing customer "Chase;" and node 356 containing customer "NFSC." FIG. 3C also depicts each customer node containing a respective pointer to a transactions data structure. In the event a query for "TTT" transactions on Feb. 2, 2016 by customer "Chase" is received, at least one processor can first traverse the BST structure 310 to arrive at node 334 containing the "TTT" symbol, which leads to BST structure 334A. The processor can then traverse BST structure 334A to find the "Chase" customer in node 354, which leads to the transactions data structure 334B. The data from the transactions data structure 334B may be returned in response to the query. Adding the extra BST containing the client names may improve the efficiency of searches for client transactions on a particular day by making the search less linear.

The hierarchies discussed above are merely illustrative. As such, it is understood that the hierarchy can contain different combinations of data structures. For example, the first level may be a BST, the second level may be an array, and a third level may be another BST. The combination of data structures used in a particular hierarchy may be catered to the queries that are most commonly received. The hierarchy for a particular system may also be designed to reduce the linearity of the search. However, different situations may require different data structure arrangements.

Figure 4:
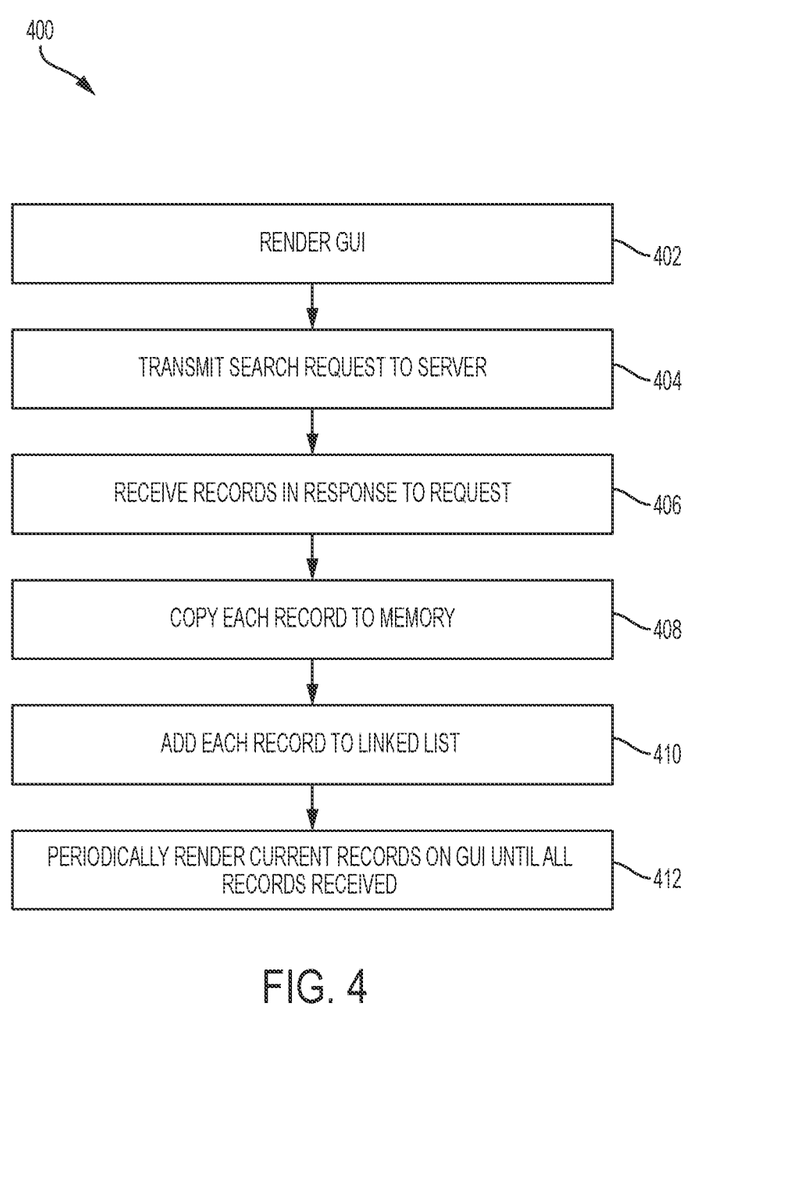
FIG. 4 is another example flow diagram in accordance with aspects of the present disclosure.
Figure 5:
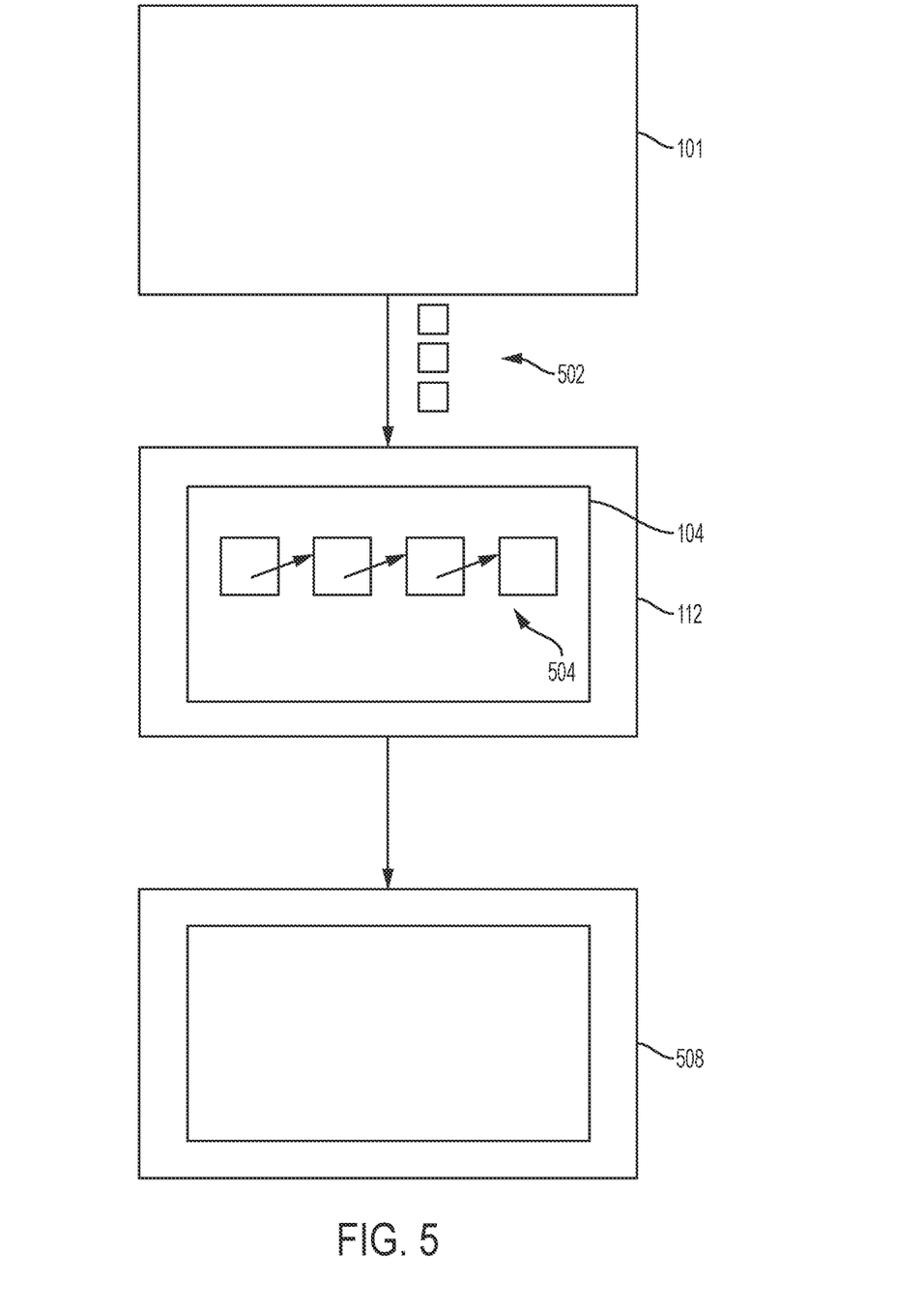

Another area where performance of big data queries may be improved is at a client device requesting data. A working example of displaying results of a big data query is shown in FIGS. 4-5B. In particular, FIG. 4 illustrates a flow diagram of an example method 400 for displaying results of a query and FIGS. 5-5B show a corresponding working example. The actions shown in FIGS. 5-5B will be discussed below with regard to the flow diagram of FIG. 4.

Referring to FIG. 4, at least one processor of a computer apparatus may render a GUI on a screen, as shown in block 402, and transmit a search request to a remote server, as shown in block 404. In block 406, at least one processor may receive a plurality of records in response to the search request and, in block 408, each received record may be copied to a respective allocated memory space. In one example, a format of each received record may match a format of each memory space allocated for each record. Keeping the formats between the memory spaces and the records consistent may allow at least one processor to efficiently copy fields of each received record into a corresponding field in memory. As such, the time to process the resulting records may be reduced, since no reformatting of fields, data types, or data objects may be needed.

Referring to FIG. 5, computer apparatus 101 may be the server computer providing records to computer apparatus 112, which may be the requesting client computer. Computer apparatus 101 is shown returning records 502 to computer apparatus 112. The records may be displayed on display device 508.

Referring back to FIG. 4, each allocated memory space may be added to a linked list of memory spaces, as shown in block 410. In one example, the order of the linked list may reflect the order in which the records were received. FIG. 5 shows a linked list 504 of records in memory 104. Referring back to FIG. 4, the records that are currently received may be rendered on the GUI periodically, as shown in block 412. In one example, the records may be rendered whenever a predetermined period of time expires, such as every one second. The advantage of refreshing the GUI periodically is that a user can still browse the currently received results while remaining results are still in transit. Therefore, if network latency occurs, such latency may be concealed from the user, since the user can already see results on the GUI. In one example, the refresh may continue periodically until all the results are received.

Figure 5A:
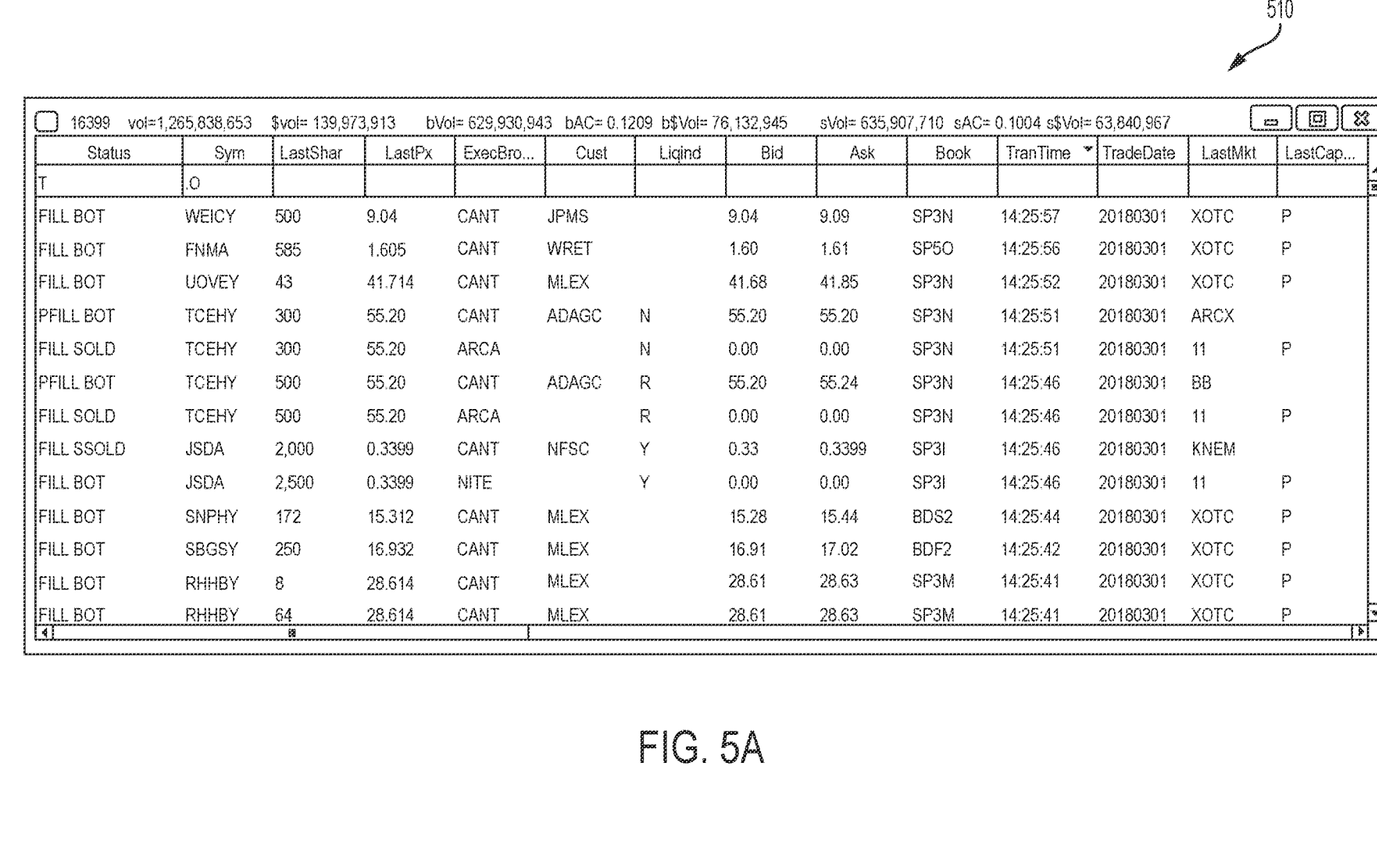

Referring to FIG. 5A, an illustrative GUI 510 with trading data query results is shown. The GUI comprises fields that may be typical of trading data including, but not limited to, status, symbol, price, size, etc. In one example, at least one processor of the client device may detect a user selection of a given column displayed on the GUI. In response to the selection, the processor may display aggregate data corresponding to the given column. By way of example, a user may click on the symbol ("Sym") column of GUI 510. As a result, at least one processor may render another GUI 514, as shown in FIG. 5B, that aggregates all the orders related to the symbol column. In one example, at least one processor may do a linear scan of the linked list (e.g., linked list 504) using the symbol column as the key in response to the user clicking on the symbol column. That is, a user may click on any column and at least one processor may us the selected column as a key for the linear scan.

Advantageously, the above-described apparatus, non-transitory computer readable medium, and method generate an index with a hash table and multiple levels of data structures that may be optimal for common queries related to transactions on a specific date. Furthermore, a client device may allocate memory with a format matching that of the query results and may refresh the query results on a GUI periodically. In turn, a user can still see data on the GUI, even if there is a delay in retrieving the results. Accordingly, the index and GUI techniques disclosed above improve the performance of the computer by accelerating big data queries on the server and accelerating the display of the query results on the client.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. An apparatus, comprising:
a memory storing interlinked data structures; and
at least one processor, configured to:
generate a hash table storing dates and memory addresses indicating locations in the memory where data structures of the interlinked data structures are stored, in which each entry of the hash table associates one of the dates to one of the memory addresses;
receive a search request including at least a search date;
detect, within the hash table, a matching entry including the search date, and retrieving a memory address indicated by the matching entry;
execute a search of the interlinked data structures based on the search request, beginning at a first data structure indicated by the retrieved memory address, wherein the search is executed according to a plan including a set depth of travel within the interlinked data structures, and the first data structure is stored at the retrieved memory address and corresponds to a first level of the set depth of travel; and
return results of the executed search.

2. The apparatus of claim 1, wherein executing the search further comprises:
initiating the search by accessing the memory at the retrieved memory address.

3. The apparatus of claim 1, wherein the interlinked data structures includes a hierarchy, and executing the search further comprises:
generating the plan for traversing the interlinked data structures based on one or more search parameters included in the search request.

4. The apparatus of claim 3, wherein the first data structure includes a first binary tree data structure, corresponding to the first level.

5. The apparatus of claim 4, wherein each node of the first binary tree data structure includes a pointer to a second data structure belonging to a second level in the hierarchy.

6. The apparatus of claim 5, wherein the second data structure includes a second binary tree data structure.

7. The apparatus of claim 6, wherein each node of the second binary tree data structure includes a pointer to a third data structure belonging to a third level in the hierarchy.

8. The apparatus of claim 5, wherein the second data structure includes a vector data structure.

9. An method in an electronic device, comprising:
storing, in a memory, interlinked data structures;
generating, via at least one processor, a hash table storing dates and memory addresses indicating locations in the memory where data structures of the interlinked data structures are stored, in which each entry of the hash table associates one of the dates to one of the memory addresses;
receiving a search request including at least a search date;
detecting, via the at least one processor, within the hash table, a matching entry including the search date, and retrieving a memory address indicated by the matching entry;
executing, via the at least one processor, a search of the interlinked data structures based on the search request, beginning at a first data structure indicated by the retrieved memory address, wherein the search is executed according to a plan including a set depth of travel within the interlinked data structures, and the first data structure is stored at the retrieved memory address and corresponds to a first level of the set depth of travel; and returning results of the executed search.

10. The method of claim 9, wherein executing the search further comprises:

initiating the search by accessing the memory at the retrieved memory address.

11. The method of claim 9, wherein the interlinked data structures includes a hierarchy, and executing the search further comprises:

generating the plan for traversing the interlinked data structures based on one or more search parameters included in the search request.

12. The method of claim 11, wherein the first data structure includes a first binary tree data structure, corresponding to the first level.

13. The method of claim 12, wherein each node of the first binary tree data structure includes a pointer to a second data structure belonging to a second level in the hierarchy.

14. The method of claim 13, wherein the second data structure includes a second binary tree data structure.

15. The method of claim 14, wherein each node of the second binary tree data structure includes a pointer to a third data structure belonging to a third level in the hierarchy.

16. The method of claim 13, wherein the second data structure includes a vector data structure.

* * * * *